United States Patent [19]

Lechot et al.

[11] Patent Number: 4,577,536
[45] Date of Patent: Mar. 25, 1986

[54] FEED APPARATUS FOR AUTOMATIC LATHES

[75] Inventors: André Lechot, Orvin; Alexandre Louis, Le Landeron, both of Switzerland

[73] Assignee: LNS, S.A., Berne, Switzerland

[21] Appl. No.: 676,230

[22] Filed: Nov. 30, 1984

Related U.S. Application Data

[63] Continuation of Ser. No. 396,666, Jul. 9, 1982, abandoned.

[30] Foreign Application Priority Data

Jul. 15, 1981 [CH] Switzerland .................. 4650/81

[51] Int. Cl.[4] .................. B23B 13/08; B23B 15/00
[52] U.S. Cl. .................. 82/2.7; 82/38 A; 181/196; 226/196; 414/17; 308/3 A
[58] Field of Search .......... 82/2.5, 2.7, 38 R, 38 A; 226/196; 414/14–18, 745, 748; 181/196; 193/98; 206/443, 523, 593; 53/472

[56] References Cited

U.S. PATENT DOCUMENTS

| | | | |
|---|---|---|---|
| 1,020,460 | 3/1912 | Smith | 82/38 R |
| 2,471,209 | 5/1949 | Gazdik | 206/443 |
| 2,718,302 | 9/1955 | Capaldi | 206/593 |
| 3,206,020 | 9/1965 | Billingsley et al. | 206/443 |
| 3,602,075 | 8/1971 | Waefler | 82/2.5 |
| 3,606,807 | 9/1971 | Rast | 82/38 R |
| 3,693,810 | 9/1972 | Gumhold | 82/2.7 |
| 3,812,983 | 5/1974 | Wanner et al. | 82/2.7 |
| 3,874,519 | 4/1975 | Mikami | 82/2.7 |
| 3,890,860 | 6/1975 | Gordon | 82/38 A |
| 3,910,476 | 10/1975 | Zajac | 82/2.5 |
| 4,037,733 | 7/1977 | Doe et al. | 82/2.5 |
| 4,049,173 | 9/1977 | Gomez-Alecha | 82/38 A |
| 4,099,617 | 7/1978 | Nist | 206/443 |
| 4,292,864 | 10/1981 | Cucchi et al. | 82/2.7 |

FOREIGN PATENT DOCUMENTS

| | | | |
|---|---|---|---|
| 567554 | of 1958 | Belgium | 53/472 |
| 0026042 | 4/1981 | European Pat. Off. | |
| 2298254 | 8/1976 | France | |
| 585601 | 3/1977 | Switzerland | |
| 476601 | 12/1937 | United Kingdom | |
| 551952 | 3/1943 | United Kingdom | |
| 2000702 | 1/1979 | United Kingdom | 82/2.7 |

*Primary Examiner*—Francis S. Husar
*Assistant Examiner*—Jerry Kearns
*Attorney, Agent, or Firm*—Parkhurst & Oliff

[57] ABSTRACT

Feed apparatus for automatic lathes comprises a central section bar surrounded by one or more peripheral section bars, longitudinal grooves of arcuate cross-section in all the section bars matching and cooperating with each other to form longitudinal passages for guiding bar stock when the section bars are assembled. Linings may be placed in these passages to form tubes for guiding the bar stock, these tubes being very accurately positioned relative to the outer surface of the apparatus, which may be an outer tube into which the assembly of section bars is inserted. Hence the stock-guiding tubes can be more precisely positioned, and the apparatus can be produced at low cost because the section bars are inexpensive and assembly is simple. The apparatus is particularly suitable for feeding lathes on which objects made from bar stock of very different diameters has to be machined.

22 Claims, 7 Drawing Figures

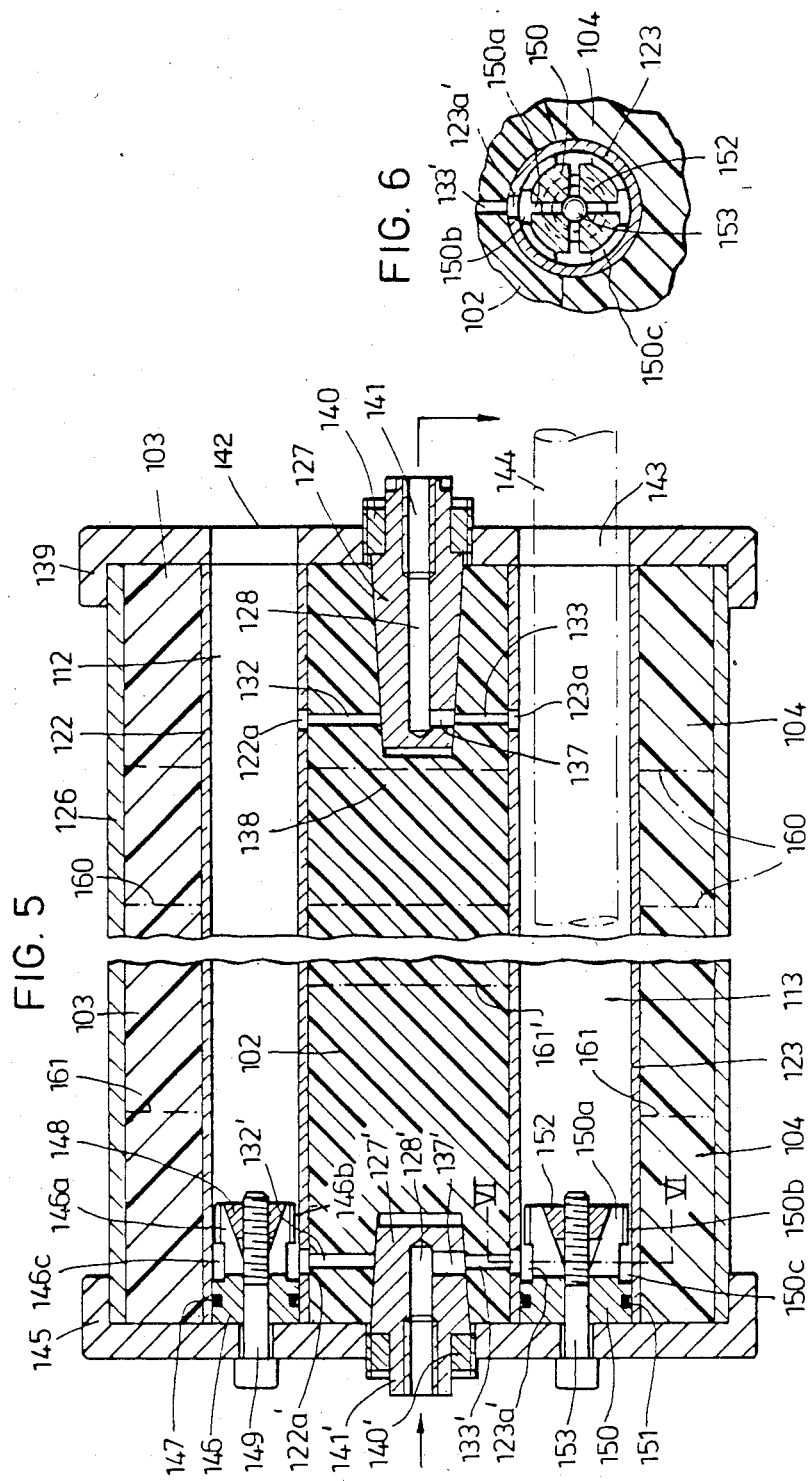

FEED APPARATUS FOR AUTOMATIC LATHES

This is a continuation of application Ser. No. 396,666 filed July 9, 1982 and now abandoned.

BACKGROUND OF THE INVENTION

1. Field of the Invention

This invention relates to feed arrangements for machine tools, and more particularly to feed apparatus for automatic lathes, of the type having a plurality of tubular stock-guiding spaces of different diameters, comprising an elongated cylindrical body defining the main axis of the apparatus and containing the aforementioned spaces, all of which have their longitudinal axes parallel to that of the main axis and equidistant from it.

2. Description of the Prior Art

Feed apparatus of this type is commercially available, e.g., from the assignee of this application, which markets such apparatus as model HYS or "Superhydrobar." FIGS. 1 and 2 of the accompanying drawings illustrate in a general manner this prior art apparatus in which a number of metal tubes, usually five such tubes of different diameters, are housed within an outer metal tube or jacket where they are held in place by a filler substance poured into the outer tube. The inner tubes constitute guides for bar stock to be machined.

The axes of the inner tubes of such apparatus should be strictly parallel to and equidistant from the main axis, which is that of the outer tube or jacket, if the apparatus is to perform properly. In the prior art design, these two requirements are substantially met by the expensive means of using tooling especially designed to hold the several tubes in place relative to one another while the liquified filler substance is poured in. In this complicated method, the ends of the tubes are secured in the proper relative positions, so that steps must also be taken to keep the tubes from bending in the middle, particularly in the case of the smallest tubes, during pouring and subsequent hardening of the filler. Although it would naturally be possible to prevent such bending by keeping the tubes vertical during the pouring operation, this approach presents other problems inasmuch as the tubes are usually some five meters long. If the tubes were positioned at an angle during pouring, there would be precisely the risk of their sagging.

Moreover, the requirement for concentricity, i.e, that the axes of the inner tubes should all be equidistant from that of the surrounding tube, is met only approximately in the prior art apparatus. In practice, it is necessary to insert small wedges or wedging cylinders at the location where the outer tube is held in place near the rear of the headstock of a lathe in order to ensure that whichever of the guide-tubes is in operation, i.e, the one brought into the bottom position by rotating the outer tube, is precisely aligned with the axis of the spindle of the lathe. It it were possible to ensure that the axes of all the inner tubes were situated exactly on a single circumference centered about the main axis of the apparatus, i.e., the axis of the outer tube, there would be no need for such wedging, which has to be carefully carried out depending upon the position of a certain inner tube within a certain outer tube. Briefly stated, the feed apparatus could be properly standardized, and its use could be simplified, if the requirement for axial concentricity could be strictly met.

This invention amounts to reversing the manner in which apparatus of the type in question was first constituted, viz., as a composite barrel or drum, somewhat resembling the cylinder of a revolver. Such composite apparatus differs from the present apparatus in that all the component tubes were of the same diameter, which simplified the construction and made it possible to achieve good accuracy without any great difficulty. The composite apparatus was made up by taking a number of tubes and joining them by means of hoops, braces, disks, etc., to form a sort of cage. This type of assembly was naturally also contemplated for producing apparatus of the type in question, especially the apparatus sold by the present assignee under the registered trademark "Hydrobar"; however, certain difficulties were encountered. Firstly, it was found very difficult to assemble tubes of different diameters to form a composite barrel or drum with sufficient accuracy of positioning because of the angular variations differing according to the diameters of the tubes and because of the difficulty of radial positioning, likewise considering the differences in tube diameter; and secondly, the great waste of space entailed by a composite barrel design and no longer tolerable as soon as large-diameter tubes were involved (adjacent to smaller-diameter tubes). The composite-barrel solution, i.e., the construction of a cage from its components, was therefore abandoned in favor of a design utilizing a filler material (as shown in FIG. 2, illustrating the prior art). In this design, however, the tubes were still the main elements of the structure, the filler substance being provided only to stabilize the locations of the tubes and to position them relative to one another in a fairly simple manner. Yet the tubes formed the main structure, the filler the supporting structure.

BRIEF SUMMARY OF THE INVENTION

It is therefore an object of this invention to provide improved feed apparatus for automatic lathes which solves the foregoing problems by making it possible to simplify the manufacture of the apparatus, reduce manufacturing costs, and satisfy the geometric requirements more fully, chiefly the requirement for concentricity in disposing the bar-stock guides within the overall cylindrical arrangement.

Another object of this invention is to provide such feed apparatus which is both less expensive to manufacture and more precise in its dimensions, thus more convenient to use.

To this end, in the feed apparatus according to the present invention, of the type initially mentioned, the improvement comprises forming the apparatus of at least one length of a central section bar and at least one length of an annular marginal section bar or of a plurality of marginal section bars in the shape of a shell placed edge to edge and assembled about the length of the central section bar, the periphery of the central section bar being provided with longitudinal grooves having a cross-section forming a portion of an arc of a circle, and the inside surface of the marginal section bar or bars being provided with longitudinal grooves complementary to those of the central section bar, so that the arrangement of the marginal section bar or bars about the central section bar creates longitudinal cylindrical spaces which constitute the mentioned tubular stock-guiding spaces or which constitute respective housings for linings made up of tubes, the inner space of which constitutes such a tubular stock-guiding space.

The present invention further includes a particularly advantageous method of manufacturing the feed apparatus described above.

In the present invention, the procedure is just the reverse of that described above. A solid, or partially solid, unit is created, designed and constructed in a particular manner which had to be expressly imagined because nothing like it had previously existed. First of all, therefore, a solid structure including empty tubular spaces is formed. Thereafter, tubes or linings may be, but need not be, inserted in the tubular spaces in order to form suitable stock-guides, however, these tubes, if used, are put in place after the structure has been produced, i.e. they are inserted into empty spaces suitably contrived in the structure, and they are not used to form the structure.

It is above all this reversal of the structural concept of the apparatus which distinguishes the present invention from all the prior art feed apparatus of this type.

BRIEF DESCRIPTION OF THE DRAWINGS

A preferred embodiment of the invention and two modifications thereof will now be described in detail, and in comparison with the prior art, with reference to the accompanying drawings wherein;

FIG. 5 is a shortened cross-sectional view taken on the line V—V of FIG. 3, this line also being indicated in FIGS. 4 and 7 for purposes of reference, FIG. 6 is a cross-sectional view taken on the line VI—VI of FIG. 5, showing details of an end plug.

DETAILED DESCRIPTION

Figure 1:
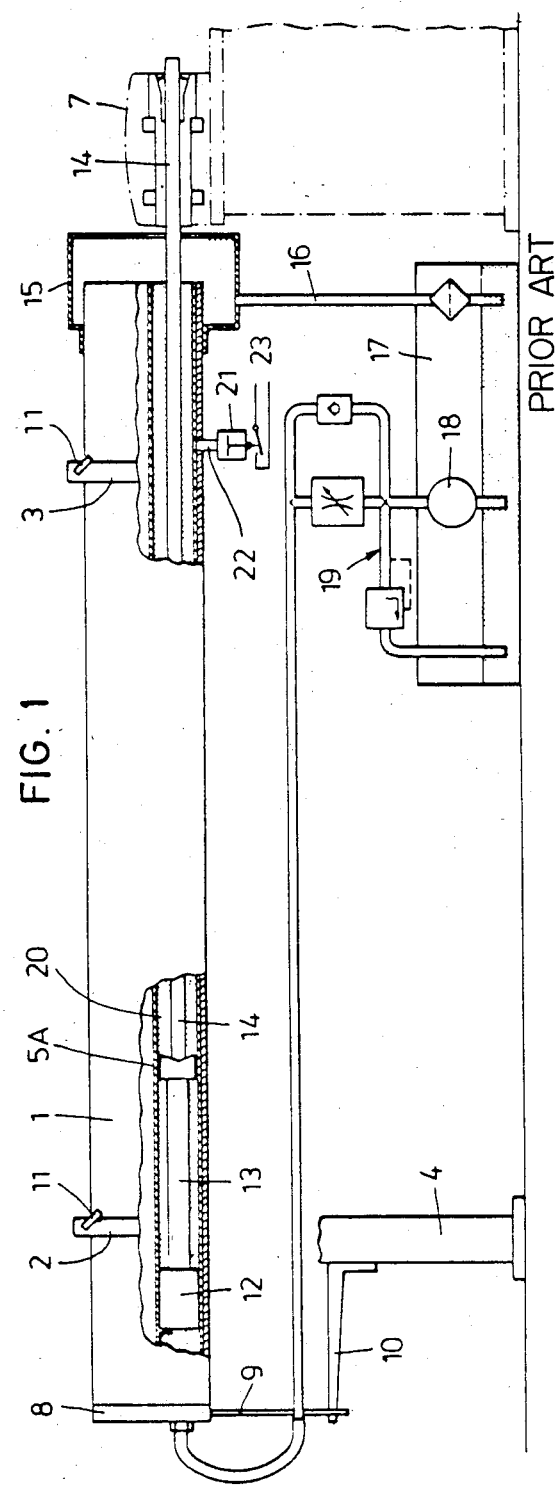
FIG. 1 is an overall elevational view, partially broken away and in section, showing the general arrangement of prior art feed apparatus.
Figure 2:
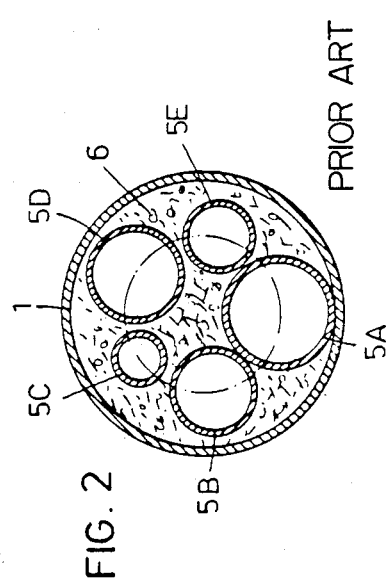
FIG. 2 is a cross-sectional view through prior art feed apparatus of the type shown in FIG. 1 taken along line II—II of FIG. 1.

FIGS. 1 and 2 shown a known feed device of the LNS HYS type (Superhydrobar), mentioned earlier. An outer tube or jacket 1, which is movable and rotatingly indexable by means of a manual control, is held in a rear bearing 2 resting on a fixed support 4 and in a front bearing 3 resting against another fixed support or similar element (not shown). Within outer tube or jacket 1, as may be seen in FIG. 2, there are a number of inner guide tubes 5A, 5B, 5C, 5D, and 5E embedded in a molding material or filler substance 6. The longitudinal axes of inner tubes 5A-5E are all at the same distance from the main axis of the apparatus, i.e, the longitudinal axis of outer tube or jacket 1, so that, as need be, one or the other of these guide tubes 5 may be axially aligned with the spindle of a headstock 7 of an automatic lathe. The positioning of the feed apparatus on the supports is such that it is the lowermost of the guide tubes 5 which is thus aligned. Some other arrangement could naturally be used, depending upon the supports. A piece of bar stock 14 to be machined is situated within guide tube 5A, aligned with the lathe spindle; whenever a bar is completely used up and a new bar must be inserted in the tube, the front part of the feed apparatus can slide laterally on the supports, in a manner not shown here.

The hoops of bearings 2 and 3 are suitably arranged in such a way that outer tube or jacket 1 can be securely fixed on the supports, at the rear of the lathe, by means of a hook bolt 11. Bar 14 is pushed within the stock-guiding tube (guide tube 5A in FIG. 1) by a stock pusher 13, behind which there is a piston 12. Each of the guide tubes 5A-5D contains a piston of appropriate diameter actuating a stock pusher. Pressurized oil is supplied to the rear of the guide tube 5 through an opening in a rear cover 8 which closes the apparatus. An oil supply and recovery arrangement 16-19 applies oil pressure behind piston 12 in the guide tube 5 so as to push this piston forward in order to advance bar 14 when it is released from the spindle chuck of the lathe by the automatic operation of the latter. If it is a movable-headstock lathe, the oil pressure keeps the bar stock from withdrawing when the headstock withdraws with the chuck open.

Between piston 12 and guide tube 5 there is a radial clearance which allows the passage of a certain amount of pressurized oil. In addition, an oil channel may be provided inside piston 12. Thus, a certain quantity of oil passes from behind piston 12 around stock pusher 13, then into space 20 around bar 14; this oil ensures that the feed device, within which bar 14 rotates, is lubricated to operate smoothly, without wear and tear, and without excess noise. The oil naturally flows toward the front into end housing 15 from, where it returns through a conduit 16 to an oil reservoir 17. In addition to these parts 15, 16 and 17, the oil supply and recovery arrangement comprises a pump 18 and a system 19 of piping and regulating components for supplying the oil in the desired quantity and at the desired pressure to the rear of stock-guiding tube 5A.

It will be noted that cover 8 is prevented from rotating by an arm 9 and a bar 10 fixed to rear support 4.

At the front of the apparatus, a conduit 22 transmits the pressure of the oil to a pressure sensor 21 actuating a contact 23. It will be readily understood that the oil pressure in front of piston 12 is lower than behind the piston, and when piston 12 passes the location of conduit 22, sensor 21 detects an increase in pressure and consequently actuates switch 23. The length of stock pusher 13 and the position of conduit 22, taking into account the distance between the front of the apparatus and the spindle chuck of the lathe, are such that sensor 21 actuated contact 23 just when the piece of bar stock 14 is used up to the maximum, stock pusher 13 then being situated in headstock 7. A reversal of the oil pressure behind piston 12, i.e., the presence of an underpressure of oil there, causes piston 12 and stock pusher 13 to retract to the rear of guide tube 5A, while the stub of bar stock remains temporarily in the chuck prior to being extracted by suitable means when the stock-guiding tube is reloaded with a new piece of bar stock to be machined.

The feed apparatus operates properly provided the ratio between the diameter of the bar stock and the inside diameter of the guide tube is kept within a certain appropriate range. For example, a tube approximately 20 mm. in diameter is suitable for bars on the order of 12-17 mm.; for bars of smaller diameter, a smaller tube should be used. It is for this reason that, as shown in FIG. 2, the prior art feed apparatus of the "Superhydrobar" type comprises a plurality of stock-guiding tubes which can be selectively aligned with the headstock spindle of the lathe.

The fabrication of the cylinder comprising the outer tube or jacket 1 and the inner, stock-guiding tubes 5A–5E, with the filler 6 in between, poses a certain number of problems, particularly because the various guide tubes are of different diameters. It is important that they all be kept in a position such that the distances between their longitudinal axes and the longitudinal axis of the apparatus are all equal. Moreover, the angular positions of the inner tubes are important, for the exact position in alignment with the headstock must be precisely adjustable by indexing the outer tube. In practice, manufacture of the apparatus in the manner illustrated in FIGS. 1 and 2 is expensive, complicated, and still does not afford more than a relative accuracy of the positioning of the guide tubes within the outer tube. This is why, for practical purposes, there are two numbered wedges for each guide tube of the feed apparatus, so that by placing these wedges relative to the support device, the outer tube can be set to the exact position in which the particular guide tube is aligned axially with the headstock spindle of the lathe.

These manufacturing difficulties and this relative lack of precision of the apparatus currently produced and sold have prompted efforts to provide a new and different design of the feed apparatus, i.e, of the assembly comprising several (usually five) stock-guiding tubes of different diameters joined to form a unit having a cylindrical outer shape. The result of these efforts is the improved feed apparatus according to the present invention, an embodiment of which will now be described with reference to FIGS. 3–6 of the accompanying drawings.

Figure 3:
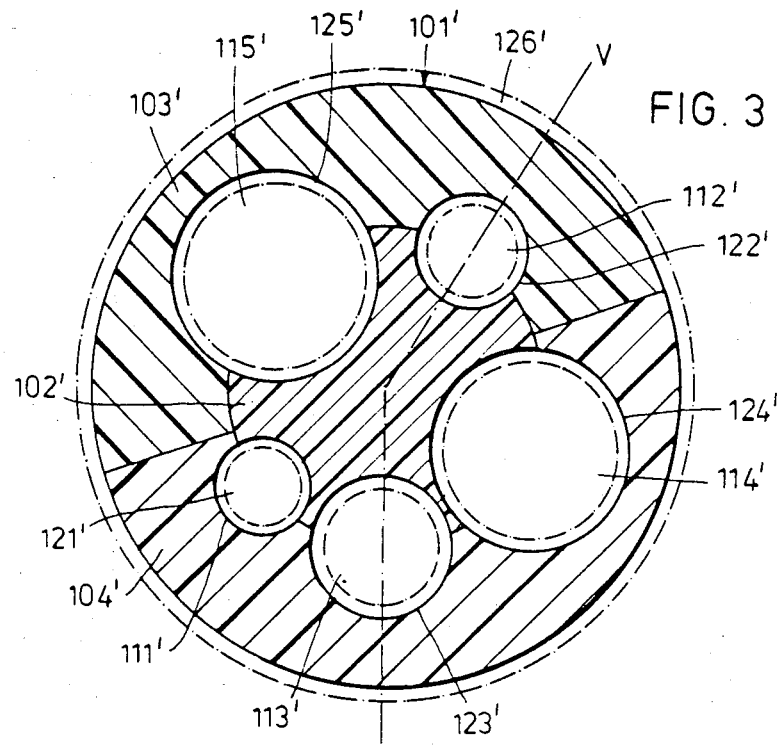
FIG. 3 is a cross-sectional view through a feed device according to one embodiment of the present invention.
Figure 4:
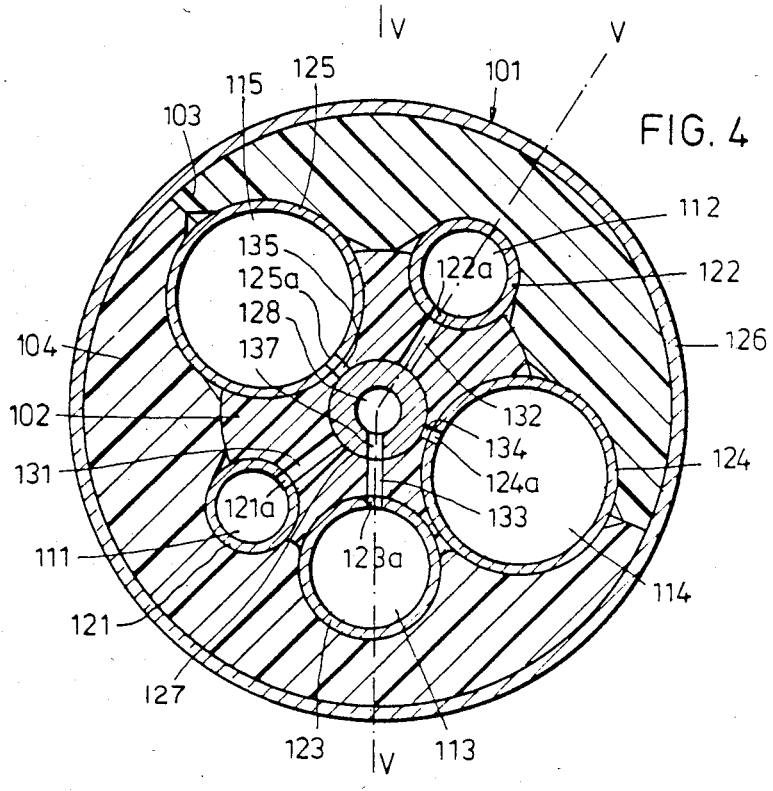
FIG. 4 is a cross-section through a feed device according to a modification of the embodiment of FIG. 3, also illustrating the presence of an oil distributor-collector disposed at one end of the apparatus.

FIGS. 3 and 4 show in cross-section the means by which a set of five stock-guiding passages are provided within a cylindrical body in a suitable manner for forming a stock feed.

Generally speaking, an elongated cylindrical body 101 (FIG. 4), 101' (FIG. 3) constituting the feed arrangement is formed of a central section bar 102, 102' surrounded by two or more peripheral section bars 103, 103' and 104, 104'. In the outer surface of central section bar 102, 102' are a number of longitudinal grooves having an arcuate, slightly less than semi-circular cross-section; and in the inner surfaces of peripheral section bars 103, 103' and 104, 104' there are matching longitudinal grooves having an arcuate cross-section of slightly more than 180 degrees (the differences from 180 degrees being attributable to the outside curvature of the central section bar and the inside curvature of the peripheral section bars). These section bars may be mass-produced by extrusion, drawing, or, in the case of synthetic material, also by molding or sintering, and they can be made with very great precision and at low cost.

With the modification shown in FIG. 3, the section bars are made of a material hard enough so that the surfaces of the longitudinal grooves alone can constitute the walls of the stock-guiding passages 111'–115'. In this case, it is not necessary to insert metal tubes in these passages, formed by the joining of two grooves, one in the central section bar and the other in a peripheral section bar. On the other hand, the two peripheral section bars should be held together, either by inserting the assembly of three section bars into an outer tube 126', as shown by a dot-dash line in FIG. 3, or by using other means of attachment (not shown) such as cementing, screws, welding, straps, or the like. In the case of assembly as in FIG. 3, it is naturally also possible to provide metal guide tubes in the form of liners 121'–125°, shown in dot-dash lines, in guide passages 111'–115', respectively. When, as in FIG. 3, passages 111'–115' formed by the surfaces of the grooves themselves are alone intended to constitute the stock-guiding passages, it may be preferable to have the walls of these passages exhibit the fewest possible longitudinal lines of junction between two section bars. It has therefore been provided in FIG. 3 that the joints between the two peripheral section bars 103' and 104' are situated at locations where there is no longitudinal groove, meaning that all the guide passages are formed by the joining of a groove of the central section bar and a groove of just one of the two peripheral section bars. Thus, each passage formed by two matching grooves includes in its wall only two longitudinal joining lines between section bars. This advantageous arrangement is not an absolute necessity, however.

If it is intended to insert tubes or linings in the guide passages because the section bars are made of a material which does not possess the requisite hardness and strength, which will especially be true if the material is a plastic, it does not matter whether the two outer section bars are joined at the location of a tubular passage or elsewhere. A modification in which the joint is situated at the location of a tubular passage is illustrated in FIG. 4. It will be seen that, generally speaking, the arrangement of the passages formed by the grooves of the section bars is the same as in FIG. 3. However, peripheral section bars 103 and 104 in FIG. 4 are joined at the locations of the two largest passages 114 and 115. Hence section bars 103 and 104 can be of a somewhat less complicated shape; passages 114 and 115, on the other hand, each have part of their wall formed by central section bar 102, another part by peripheral section bar 103, and the remaining part by peripheral section bar 104. This is of no importance, however, since all the guide passages are provided with linings 121–125 for passages 111–115, respectively. FIG. 4 also shows the outer tube 126, it being understood that this outer tube might be dispensed with and that the outer surfaces of the section bars may provide the desired support. In such a case, a polygonal rather than circular outer surface might be contemplated, so that the apparatus could be indexed more easily. In the modification illustrated in FIG. 4, however, section bars 102–104 are of synthetic material, requiring the use of inner metal linings or tubes; although outer tube 126 is also shown in solid lines, it is actually optional. If section bars 102–104 were hard enough, linings 121–125 could be dispensed with as well.

Also shown in FIG. 4, within central section bar 102, is a rotary distributor or collector 127 by means of which a central duct 128 can communicate selectively with each of the stock-guiding passages 111–115 of different diameters. For this purpose, the various inner tubes or linings 121–125 are each provided with a hole 121a–125a facing a radial duct 131–135 in central section bar 102. Rotary distribution 127 is mounted in a central cavity situated adjacent to the end of the apparatus and likewise comprises a radial duct 137. Depending upon the position of distributor 127 relative to the apparatus as a whole, duct 137 communicates with one or the other of the five radial ducts 131–135. Thus, axial central duct 128 can be selectively caused to communicate with each of the guide passages 111–115. The arrangement of this central distributor is illustrated more precisely in FIG. 5.

The two linings (inner stock-guiding tubes) 122 and 123 are visible in FIG. 5. They are held between section bars 102/103 and 102/104, respectively, and the drawing figure, greatly shortened, shows how the feed apparatus is contructed. In reality, the apparatus is approximately 5 meters long and 10–40 cm. in diameter. Two end flanges 139 and 145 of slightly differing shapes are fixed to outer tube or jacket 126 at the ends of the apparatus. A piece of bar stock 144 to be machined is shown inside the bottom tube 123.

Central distributor 127 is slightly conical in shape and is fitted in a likewise conical cavity 138 in the front end of the apparatus. It is, in fact, a collector intended to transmit the oil pressure prevailing at the front of the guide tube being used, in order to actuate a sensor, analogous to sensor 21 in FIG. 1, at the proper moment. The conicity of collector-distributor 127 and of cavity 138 ensures fluid-tightness between part 127 and section bar 102. Central axial duct 128 of distributor 127 is provided toward the outside with a thread 141 for connecting a pressure-transmission pipe. A clamping ring 140 is screwed into the internal thread of an opening in the front flange 139 for tightening the conical part constituting the distributor 127 in cavity 138. It will be seen that radial duct 137 of distributor 127, communicating with axial duct 128, is in alignment with radial duct 133 in central section bar 102 and with hole 123a in tube 123, so that oil can flow from the interior of tube 123 through ducts 133 and 137 into central duct 128. Once distributor-collector 127 has been placed in the desired position, it can be locked there by means of threaded ring 140, if necessary, in order to prevent any accidental movement and, simultaneously, to ensure fluid-tightness with the aid of the conical surfaces. Because of the possible slight axial displacement of rotary part 127, its radial duct 137 is preferably somewhat wider than radial duct 133 of section bar 102. It will furthermore be seen that radial duct 132, communicating with the inside of tube 122 via hole 122a, reaches the peripheral surface of rotary part 127 but is blocked there, so that no connection exists between central duct 128 and the stock-guiding passage 112 bounded by lining 122. Conical rotary part 127 seals off radial duct 132, as well as the other three non-selected radial ducts 131, 134, and 135 (see FIG. 4).

At the front of the apparatus, flange 139 includes not only the central threaded opening necessary for the central distribution arrangement, but also five apertures aligned with the stock-guiding tubes, two such apertures, 142 and 143, being shown in FIG. 5.

At the rear, the feed apparatus comprises a rotary distributor arrangement analogous to that just described but intended to admit the oil and distribute it to a selected one of the stock-guiding tubes. The reference numerals designating the parts of this rear distribution arrangement are the same as those designating the corresponding parts of the front arrangement, but with the addition of a prime, e.g., rotary part 127′. The operation and disposition of the parts are identical and therefore need not be described again. It should be noted, however, that the front arrangement is preferably deeper than the rear one inasmuch as the radial pressure-sensing ducts must open out farther from the front end of the tube than the radial ducts of the rear arrangement do from the rearward end. Furthermore, the oil-supply arrangement at the rear will preferably have wider ducts than the front arrangement, which need only transmit an oil-pressure value.

Because the stock-guiding passages receive their oil laterally, they must be shut off at the rear. For this purpose, a plug is provided in each such passage, e.g., plug 146 for passage 112 and plug 150 for passage 113. FIG. 6 is a cross-section through plug 150, which comprises a solid rear portion encircled by a gasket 151, then by a circular groove 150c from which four longitudinal, i.e. axial, grooves 150b open out at right angles. From each groove 150b there extends in turn at right angles a radial slot 150a, thus splitting plug 150 into four sectors which can be moved away from one another. Plug 150 further comprises an axial bore into which a screw 153 extends through a hole in flange 145 so that the head of screw 153 rests against the outside of flange 145. At the other end, screw 153 bears a conical nut 152 fitted into a conical recess disposed at right angles to the above-mentioned four sectors of plug 150. Thus, by tightening screw 153 in conical nut 152, it is possible to push these four sectors apart so that they press against the inside wall of tube 123 and fix plug 150 firmly in that tube while leaving an oil passage between circular groove 150c and guide passage 113 via axial grooves 150b. The construction of plug 146 relative to tube 122 and guide passage 112 is identical, parts 146 (a, b, c) through 149 corresponding to parts 150 (a, b, c) through 153. This construction will be readily understood with reference to FIGS. 5 and 6. Gaskets 147 and 151 ensure fluid-tightness between plugs 146, 150 and tubes 122, 123, respectively; if need be, a further gasket (not shown) may be disposed between each plug 146, 150 and the cylindrical portion of the associated screw 149, 153.

It will be obvious that other designs of the rotary distributor or collector would be possible, particularly one comprising cylindrical rotary parts rather than conical ones, with gaskets inserted where necessary.

Since the stock-guiding tube in operation is always the lowermost one, the rotary distributor does not actually rotate relative to the environment, but it is rather the whole apparatus which rotates about the distributor, which maintains its position. In practice, however, it is the relative rotation of the distributor and the apparatus as a whole which is considered. In any event, the distributor, fixed, will rotate integrally with cylindrical body 101 when the latter is indexed and will then be reset to the correct positon by manually-controlled rotation within body 101.

Manufacture of the apparatus shown is simple: all that is needed are section bars which can be mass-produced very accurately and inexpensively. These section bars are cut into pieces of the desired length and assembled in such a way that their longitudinal grooves are properly matched. The simplest way to hold the three section bars together is to slide them into an outer tube, with linings then being inserted into the respective passages endwise. If it were desired to put the linings in place from the side rather than to insert them from the end, this would present no problem as concerns the grooves of the central section bar but would require special measures as concerns the peripheral section bars because their grooves have an arcuate cross-section exceeding 180 degrees. However, with the type of assembly shown in FIG. 4, the two largest guide tubes 124 and 125 are held between parts of three section bars and could easily be put in place from the side. As for tubes 121-123, it would need no more than a slight alteration of the edges of the peripheral section bar grooves at the locations where passages 111, 112, and 113 are formed. The slight notch which would then exist at those locations would create a very small empty space in the apparatus, but this would be of no importance. In the modification of the embodiment as illustrated in FIG. 4, assembly would take place by first placing tubes 121 and 123 in their grooves in peripheral section bar 104, then joining the two largest tubes 124 and 125 to central section bar 102 in the proper grooves, next setting section bar 102 with tubes 124 and 125 against section bar 104 with tubes 121 and 123, then disposing tube 122 in its groove in central section bar 102, and finally putting peripheral section bar 103 in place. A careful study of the geometry of FIG. 4 will show that this would be possible just by means of very small notches in the edges of those peripheral section bar grooves whose arcuate cross-section exceeds 180 degrees, giving them a shell shape.

Figure 7:
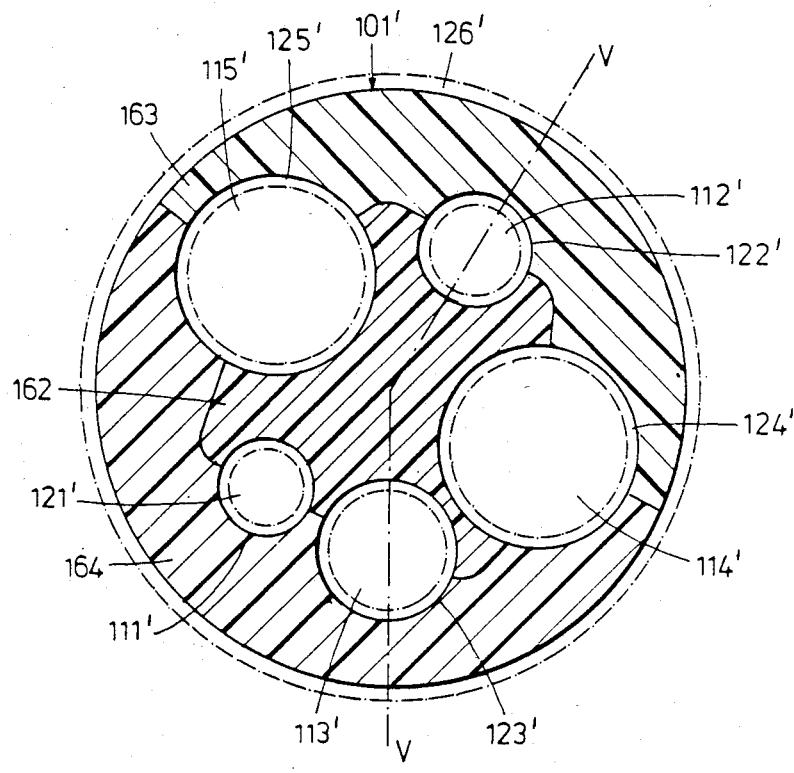
FIG. 7 is a cross-sectional view analogous to FIG. 3, showing a configuration of the section bars whereby tubes or linings can be fitted transversely, thus greatly decreasing the amount of working space needed for assembly.

In connection with the type of assembly just described, the use of section bars of a somewhat different shape affords an advantageous possibility of fitting the tubes. This modification derives from the structure of FIG. 3 and is shown in FIG. 7. The general arrangement of the section bars is the same, but central section bar 102' and peripheral section bars 103' and 104' are replaced by differently shaped section bars 162, 163, and 164, respectively. Furthermore, section bars 163 and 164 are joined at right angles to the largest tubes 124' and 125', as in the case of FIG. 4.

In the design illustrated in FIG. 7, no section bar groove has an arcuate cross-section exceeding 180 degrees. The largest tubes 124' and 125' each rest against three arcuate section bar portions which are all appreciably less than 180 degrees, while the smaller tubes 121', 122', and 123' each rest against two portions of just 180 degrees. It should be noted that the section bar surface portions in which the grooves intended for tubes 121' and 123' are made must be on a straight line passing through the centers of the two respective tubular passages. The analogous surface portions for tube 122' must likewise be on a straight line parallel to the one just mentioned; and while the lines of juncture between peripheral section bars 163 and 164 need not necessarily also be parallel to those straight lines, they must reach the circumferences of the tubular passages at the point where a straight line in such a parallel relationship and passing through the center of the respective passage would intersect the respective circumference. If these conditions are observed, not only can the five tubes be put in place transversely, i.e., there is no need to insert them endwise, but what is more, there is no hindrance to the joining of the different section bars. The larger-diameter tubes 125' and 124' must first be joined to central section bar 162, then it will be seen that the two other section bars 163 and 164 can be put in place like the cover of a box; nowhere is this operation hindered by interference with a tube. The three smaller tubes 121', 122', and 123' can be placed first in the respective groove of either the central or the peripheral section bar, as may be desired, and assembly proceeds in the same way.

It is therefore apparent that it may be advantageous to deviate from the arcuate principle in designing the section bars. In their manufacture, which must in any case be carried out in a special manner, this design modification does not involve any particular complications.

Another possible modification would be to make the outer surface other than cylindrical; however, for ease of use, apparatus of this type having a cylindrical outer surface seems preferable. Nevertheless, a design in the shape of a regular or irregular polygon is conceivable, in which case the accuracy of positioning would have to be determined relative to the planes of the sides of the polygon rather than relative to a center.

There are various other modifications which might prove advantageous in certain cases, e.g., more than two peripheral section bars, or only one such section bar of a tubular or annular shape. In the latter case, of course, the tubes or linings, if used, as well as the length or lengths of central section bar, must necessarily be inserted endwise.

Such endwise insertion of the various elements, which requires a large assembly space, can be made less onerous from this point of view by having some or all of the section bars made up of several lengths, as indicated by dot-dash lines 160, 161, 161' in FIG. 5. Lines 160 show how the overall lengths of section bar could be divided into several short lengths which may be disposed either end to end or with axial spaces between them. In the former case, lines 160 represent the meeting of two successive partial lengths, while in the latter case these lines represent the ends of such lengths with an empty space between them. Lines 161 and 161' show a manner of disposing relatively short lengths of section bar in which the joints of central section bar 102 are at different locations (161') along its length from the locations (161) where the joints of peripheral section bars 103 and 104 are situated. In this case, the partial lengths making up the whole would naturally have to be end to end. The rigidity of the apparatus would be increased by not having the successive breaks at the same locations, one partial central length being fitted to two partial peripheral lengths, one of the latter in turn being fitted to two partial lengths of the central section bar, etc.

The use of linings or tubes in the tubular passages does not result merely in a reinforcement of the rigidity of the material and in increased resistance to wear and tear in cases where the section bars are made of plastics; these inner tubes also make possible a precise adaptation of the desired diameter of the stock-guiding tube. It would even be possible to make these tubes interchangeable on the user's premises with a design of the "erector set" type. The various inside tube diameters may naturally be established during manufacture instead, as ordered by the customer.

The outer tube or jacket may become entirely superfluous if only one peripheral section bar, of annular shape, is used. It is a purely technological matter to decide whether or not an outer tube is advantageous in such a case. On the other hand, an outer tube is useful when there are at least two peripheral section bars. However, this outer tube might be replaced by spaced rings or by other fixing means such as screws and bolts between the two peripheral section bars. Finally, whether or not an outer tube is used to hold the structure, it may be advantageous to provide a covering of soundproofing material around the apparatus, either in the form of a tube of soft synthetic material or in the form of a coating, an enclosure, etc., according to the existing possibilities of the soundproofing art.

It will be obvious from the foregoing description that the proposed design makes it possible to achieve very desirable results, particularly as regards reductions in costs and complications coupled with increased accuracy, the attainment of which forms part of the object of the present invention.

Although one particular and preferred embodiment has been described, it will be clear to those skilled in the art that other embodiments may be envisaged without departing from the scope and spirit of the invention.

What is claimed is:

1. A guide for precisely aligning and advancing bar stock for engagement with the head stock of an automatic lathe, said guide comprising:

an elongate inner member having a central longitudinal axis and an outer surface including a plurality of longitudinal grooves extending parallel to said central axis, a first elongate outer member having an inner surface positioned opposite to a portion of the outer surface of said inner member and including at least one first longitudinal groove extending parallel to said central axis, a second elongate outer member having an inner surface positioned opposite to another portion of the outer surface of said inner member and including at least one second longitudinal groove extending parallel to said central axis, said first and second outer members being positioned relative to said inner member such that said at least one first and said at least one second longitudinal grooves are each aligned with a different one of said plurality of longitudinal grooves in said inner member to define a plurality of straight passages each having a longitudinal axis parallel to said central axis and equidistant therefrom, a guide tube disposed and retained within each of said straight passages defined by said outer and inner members, said inner surfaces of said first and second outer members cooperating with said outer surface of said inner member to support rigidly said guide tubes such that a longitudinal axis of each guide tube is coaxial with the longitudinal axis of a corresponding straight passage, said guide tubes each being straight, parallel and equidistant from said central axis, support means for rigidly securing said inner and outer members with said guide tubes therebetween to form a drum having a longitudinal axis coaxial with said central axis, and means for supporting said drum for allowing indexed rotation of said drum about said central axis to align coaxially the longitudinal axis of a guide tube with said head stock.

2. The guide of claim 1, wherein said means for rigidly securing comprises a plurality of means coupled about said outer members and spaced along the central axis for rigidly securing said first and second outer members.

3. The guide of claim 2, wherein said plurality of means comprises a plurality of annular members.

4. The guide of claim 1, wherein said first and second outer members define an outer cylindrical surface and wherein said means for securing comprises a cylindrical tube having a cylindrical opening which slidably receives said outer cylindrical surface defined by said first and second outer members.

5. The guide of claim 1, wherein each of said longitudinal grooves of said inner member and said first and second outer members are configured to define straight passages of different diameters.

6. The guide of claim 1, wherein said inner member includes;

a longitudinal passage extending coaxial to said central axis through at least a portion of said inner member; and a plurality of radial ducts extending within said inner member to provide a communicating passage between each of said plurality of straight passages and said longitudinal passage.

7. The guide of claim 6, further comprising a rotating member received for rotation within said longitudinal passage and including an axial passage and a radial passage communicating with said axial passage, said radial passage being positioned to selectively communicate with each of said plurality of radial ducts in said inner member upon rotation of said rotating member to provide selective communication between each of said plurality of radial ducts and said axial passage.

8. The guide of claim 1 wherein said support means is detachable to permit lateral insertion of said guide tubes into said straight passages.

9. The guide of claim 1 wherein said grooves forming said straight passages extend over the entire length of said drum.

10. A guide for precisely aligning and advancing bar stock for engagement with the head stock of an automatic lathe, said guide comprising:

a rigid elongate inner member having a longitudinal central axis and an outer surface including a plurality of longitudinal grooves extending parallel to said central axis, a first rigid elongate outer member having an inner surface positioned opposite at least a portion of the outer surface of said inner member and including a plurality of longitudinal grooves in said inner surface extending parallel to said central axis, a second rigid elongate outer member having an inner surface positioned opposite another portion of the outer surface of said inner member and including a plurality of longitudinal grooves in said inner surface extending parallel to said central axis, said inner and outer members being positioned such that said plurality of longitudinal grooves in said outer members are aligned with said plurality of longitudinal grooves in said inner member to define a plurality of straight guide passages with each having a longitudinal axis parallel to said central axis and equidistant therefrom, a guide tube disposed and retained within each of said straight passages defined by said outer and inner members, said inner surfaces of said first and second outer members cooperating with said outer surface of said inner member to rigidly support and radially clamp said guide tubes for their entire length such that a longitudinal axis of each guide tube is coaxial with the longitudinal axis of a corresponding straight passage, said guide tubes each being straight, parallel and equidistant from said central axis, support means for rigidly securing said inner and outer members with said guide tubes therebetween to form a drum having a longitudinal axis coaxial with said central axis, and means for supporting said drum for allowing indexed rotation of said drum about said central axis to align coaxially the longitudinal axis of a guide tube with said headstock.

11. The guide of claim 10, wherein said outer members mutually abut in longitudinal portions of said rigid elongate outer members which lack said longitudinal grooves.

12. The guide of claim 10, wherein the grooves on said inner member and said outer members have a maximum arcuate cross-section of 180°.

13. The guide of claim 12, wherein said guide passages are of at least two different diameters, and at least the largest diameter guide passage has walls determined in part by said grooves in each of said rigid elongate outer members and said rigid elongate inner member.

14. The guide of claim 10 wherein said support means is detachable to permit lateral insertion of said guide tubes into said straight guide passages.

15. The guide of claim 10, wherein said grooves forming said straight guide passages extend over the entire length of said drum.

16. A guide for precisely aligning and advancing bar stock for engagement with the head stock of an automatic lathe, said guide comprising:

an elongate rigid inner member having a central longitudinal axis and an outer cylindrical surface having a plurality of part-circular grooves extending parallel to said central axis, a first elongate rigid semi-cylindrical outer member having an outer semi-cylindrical surface and having an inner semi-cylindrical surface positioned adjacent a first portion of said outer cylindrical surface of said inner member, said inner surface of said first outer member having a plurality of part-circular grooves extending parallel to said central axis, a second elongate rigid semi-cylindrical outer member having a semi-cylindrical outer surface and a semi-cylindrical inner surface positioned adjacent a second portion of said outer surface of said inner member, said inner surface of said second outer member having a plurality of part-circular grooves in said inner surface of said second outer member extending parallel to said central axis, said first and second outer members surrounding said inner member to maintain said inner surfaces of said first and second outer members adjacent said first and second portions of the outer surface of the inner member such that said plurality of part-circular grooves in the inner surfaces of said outer members are each parallel and adjacent to a different one of said plurality of part-circular grooves in said outer surface of said inner member to define a plurality of straight guide passages in said rotatable body, a guide tube disposed and retained within each of said straight guide passages, said inner surfaces of said first and second outer members cooperating with said outer surface of said inner member to support rigidly and clamp radially said guide tubes over the length of said guide tubes such that a longitudinal axis of each guide tube is coaxial with the longitudinal axis of a corresponding straight passage, said guide tubes and guide passages each being straight, parallel to said central axis and equidistant therefrom, support means for rigidly securing said inner and outer members with said guide tubes therebetween to form a drum having a longitudinal axis coaxial with said central axis, and means for supporting said drum for allowing indexed rotation of said drum about said central axis to align coaxially the longitudinal axis of a guide tube with said head stock.

17. The guide of claim 16, wherein each of said guide tubes has a diameter and at least some of the diameters of said guide tubes differ from the diameters of others of said guide tubes.

18. The guide of claim 16, wherein said means for rigidly securing comprises a plurality of means coupled about said outer members and spaced along the central axis for rigidly securing said first and second outer members.

19. The guide of claim 18, wherein said plurality of means comprises a plurality of annular members.

20. The guide of claim 16, wherein said first and second outer members define an outer cylindrical surface and wherein said support means for securing comprises a cylindrical tube having a cylindrical opening which slidably receives said outer cylindrical surface defined by said first and second outer members.

21. The guide of claim 16 wherein said support means is detachable to permit lateral insertion of said guide tubes into said guide passages.

22. The guide of claim 16 wherein said grooves forming said guide passages extend over the entire length of said drum.

* * * * *